United States Patent [19]

Hoban

[11] Patent Number: 5,520,346
[45] Date of Patent: May 28, 1996

[54] REEL PAYOUT SYSTEM

[75] Inventor: Fay A. Hoban, Ridgecrest, Calif.

[73] Assignee: The United States of America as represented by the Secretary of the Navy, Washington, D.C.

[21] Appl. No.: 241,374

[22] Filed: May 9, 1994

Related U.S. Application Data

[63] Continuation of Ser. No. 988,558, Dec. 10, 1992, abandoned.

[51] Int. Cl.$^6$ ........................................... B65H 49/00
[52] U.S. Cl. ........................ 242/128; 242/171; 242/564; 244/3.12
[58] Field of Search ..................... 242/128, 159, 242/170, 171, 564; 244/3.12

[56] References Cited

U.S. PATENT DOCUMENTS

| | | | |
|---|---|---|---|
| 2,950,876 | 8/1960 | McLoughlin | 242/128 |
| 3,233,548 | 2/1966 | Chilowski | 244/3.12 |
| 3,868,883 | 3/1975 | Tucker | 244/3.12 X |
| 4,860,968 | 8/1989 | Pinson | 244/3.12 |
| 4,903,607 | 2/1990 | Clark | 244/3.12 X |
| 5,031,982 | 7/1991 | Redford | 242/128 X |
| 5,044,573 | 9/1991 | LeCompte | 242/159 X |
| 5,058,969 | 10/1991 | Peterson et al. | 244/3.12 X |
| 5,104,057 | 4/1992 | Chesler et al. | 242/128 X |

Primary Examiner—Daniel P. Stodola
Assistant Examiner—Eileen A. Dunn
Attorney, Agent, or Firm—Melvin J. Sliwka

[57] ABSTRACT

A reel payout system preferably for optical fiber guided tactical weapon systems to dispense a fiber data link or other strand member through a relatively small diameter exit aperture at a cone-shaped end of a housing containing the reel at relatively high velocities, the fiber dispensed from the reel generally perpendicular to the axis of rotation of the reel normal to the longitudinal axis of the housing.

17 Claims, 4 Drawing Sheets

REEL PAYOUT SYSTEM

This is a continuation of patent application: Ser. No. 07/988,558 filed on 10 Dec. 1992, now abandoned.

BACKGROUND OF THE INVENTION

The present invention relates in general to a system for dispensing a strand of fiber and pertains, more particularly, to an optical fiber payout system directed to the payout of an optical fiber substantially perpendicular to the axis of rotation of an fiber optic reel or bobbin associated with a weapon system or a communication system. The reel payout system of this invention is an improvement over the conventional longitudinal fiber payout systems.

With the conventional fiber dispensing systems it is necessary to provide payout of the fiber strand in such a way that strand stress is minimized. This is particularly important when the strand is an optical fiber used for communications purposes and particularly where such links are required to be established and maintained between relatively moving objects, such as, a launch platform and a launched weapon.

Fiber optic links are known for use between missiles or bombs and launch vehicles which are fixed (e.g., truck mounted launcher) and mobile (e.g., attack aircraft). Both the fixed and mobile applications guide the weapon in flight. However, it is recognized that difficult problems and complexities are associated with fiber optic communications links between two high velocity airborne vehicles moving relative to each other in an hostile military operations environment.

It is recognized that a fiber optic link between two vehicles moving at a high velocity relative to each other is susceptible to breakage, entanglement, and other operational and environmental stresses. These drawbacks can adversely effect the physical integrity, function, and performance of the fiber optic communications system. A significant drawback exists in a potential for the fiber optic cable to become entangled or break during pay out from conventional free-helix fiber optic payout devices.

Conventional free-helix pay out systems have numerous problems associated with the three stages of their existence. First, protecting the delicate fiber from moisture, dust, and physical damage prior to weapon release. Second, permitting fiber pay out after release without breaking it. Third, initiating pay out by releasing the fiber.

All of the foregoing drawbacks stem from a free-helix pay out in which the fiber leaves the launch vehicle travelling in a direction opposite the flight path of the launch vehicle. Furthermore, the fiber is on a cylindrical surface with the same direction as the bobbin, which intercepts the bobbin's axis at the peel point.

During fiber pay out the fiber motion and path is determined by fiber tension and aerodynamic forces. If, for any reason, the bobbin or any other interfering surface of the vehicle intercepts the fiber path, then fiber damage and failure of the data link is likely.

As a result, the bobbin must be at the rear end of the launch vehicle, facing directly aft and in line with the current flight path. If the launch vehicle experiences any significant angle of attack in the pitch or yaw planes, then the fiber risks probable breakage.

Prior to weapon release and payout a large circular hole through which a free fiber helix exits must be covered prior to weapon release. The exit hole must be covered in such a way as to protect the optical fiber data link and the remainder of the vehicle interior from all external sources of potential damage.

In general, the larger the circular hole, the more difficult it is to effectively cover. The entire perimeter of the hole must stay environmentally sealed over a wide range of operating and environment conditions. A six inch hole, for example has almost nineteen inches of perimeter over which a suitable seal must be maintained.

The cover referred to above must have the good seal instantly and reliably removed from the hole at pay out initiation. Cover removal must occur in such a way so as to pose no threat of damage to the fiber, the weapon, the launch aircraft, or other aircraft flying in formation with the launch aircraft. The requirement of rapid release in only a few milliseconds and the transition from a tight environmental seal to a complete release is a significant reliability problem.

The hole referred to above creates a point at which the aircraft can be observed by hostile forces. Whether before, during, or after flight, the large hole in the launch aircraft through which the fiber exits will likely have different dielectric behavior than that of the surrounding surface of the aircraft. This observable discontinuity will result in a reflection at radar frequencies which can be unacceptable for aircraft incorporating low-observable technology.

Another drawback associated with fiber optic pay out systems is the problem of housing the cable in order to allow simultaneous pay out at a high rate of speed between a moving launch aircraft and a weapon released from the aircraft toward a distant target.

The optical fiber is normally stored and transported on spools or bobbins having a generally cylindrical shape or a tapered cone-like shape. The optical fibers are typically wound in a tight, closely packed helix about the outside diameter of the bobbin. When the optic fiber is dispensed, or paid out from the spool on the bobbin at high speed, it is known to pull the optic fiber off the bobbin in a direction generally parallel to a longitudinal axis of the bobbin and toward the small or truncated end of the cone.

It is known and frequently observed that if the optic fiber is wound on the bobbin in a helix pattern and then pulled from a point distant from the small end of the bobbin and along the longitudinal axis, then the optic fiber leaves the bobbin in the form of a helix. The helix of optic fiber has a helix diameter that gradually decays from a diameter approximately equal to the bobbin diameter to a diameter of essentially zero. The decay typically requires the pay out of optic fiber equal in length to many hundreds of bobbin diameters.

The form of the substantially unrestrained or free-helix and the helix decay rate are functions of the geometry of the bobbin and the fiber. Other factors include the bulk material properties (e.g., fiber density and stiffness are properties of primary concern), the coefficient of friction of the optic fiber on itself, and the drag characteristics of the fiber in the respective medium (e.g., air) through which it is paid out.

In many applications the fiber must be constrained to a helix diameter which is relatively small in comparison with the bobbin diameter, through a pay out length shorter than that typically required for the natural decay of the free-helix. This is normally accomplished by guiding the fiber through a conventional rigid guide ring having a desired inside diameter and oriented in a plane perpendicular to the axis of the bobbin and also concentric with this axis.

A serious drawback of these pay out systems is that the physics of the pay out dictate that the conventional rigid guide ring constrains the helix with a resulting tendency of the optic fiber helix to "balloon" resulting in the swelling of the helix diameter before the optic fiber has passed through the conventional guide ring. The swelling takes the shape of a smooth curve outward from the point where the optic fiber leaves the bobbin and before curving down to the diameter of the constraining ring.

The shape of the aforementioned curve is determined by the above indicated factors, the diameter of the conventional guide ring, and the distance from the conventional guide ring to the point where the optic fiber leaves the bobbin. Increasing the pay out velocity increases the maximum diameter of the "balloon". This increases the tensile and bending loads placed on the optic fiber as it passes through the conventional guide ring.

Yet other drawbacks to conventional fiber optic pay out systems include two practical velocity limitations in the actual application and use of conventional pay out systems. One limitation results from the tendency of the optic fiber to balloon as the velocity increases resulting in potential interference between the optic fiber and adjacent, fixed components of any associated fiber optic pay out mechanism.

Another limitation is the actual loading on the fiber itself of static and dynamic stresses as it passes through the conventional guide ring. These loads may eventually reach the strength limit of the optic fiber at a particular velocity resulting in fiber failure. The bending loads on the optic fiber are a particular concern for the optical fibers of a weapon system. Optical fibers are typically stiff, brittle mono-filaments.

It will be recognized by those skilled in the art that the limitations related to optical fibers are applicable to mono-filament strands in general as they are paid out through a constraint such as a guide ring. It will be understood from the objects and description of the present invention that this invention is readily applicable to solving equivalent problems in the bobbin, textile, and wound fiber art.

It is believed that the similar problems encountered in the textile industry with conventional textile fiber pay out mechanisms, the pay out mechanisms used in the manufacture of filament wound structures in general may use a mechanism similar to that set forth in the following specification and claims. Similar problems are believed to exist in the telecommunications industry relative to the dispensing of optical fiber for communications purposes.

However, for the purposes of clarity and precision, the described embodiment will be limited to a launch platform (e.g., aircraft) and weapon combination.

Two additional stress problems related to the free-helix pay out of mono-filament strands can occur if the natural helix decays rapidly enough such that the bobbin structure prevents the optic fiber from following that helix. These conditions can occur when the mono-filament strand pay out is from the end of the bobbin furthest from the direction of pull.

One stress problem has been observed to occur when the taper angle of the conical bobbin is less than the decay angle of the pay out helix. The optic fiber tends to wrap tightly around the bobbin, drag along the bobbin, and pull sharply in the direction of the longitudinal axis at the end of the bobbin.

Another problem occurs as a result of conditions in which the axis of the bobbin is not aligned with the pay out direction and the bobbin does not include the guide surfaces set forth below. In this condition the optic fiber is trying to pull its way through the bobbin along the bobbin surface farthest from the pay out direction. The optic fiber is forced to drag across the corner of the bobbin.

Approaches to solving the foregoing and other problems are all directed to a dispensing system wherein the fiber strand is wound on a bobbin and the bobbin is mounted in a housing or a canister along and generally parallel to the longitudinal axis of the housing or canister. The optic fiber in the foregoing approaches still provides for optic fiber payout generally parallel to the longitudinal axis of the bobbin.

SUMMARY OF THE INVENTION

Accordingly, it is an object of the present invention to provide an improved reel payout system that is adapted to reduce torsional and bending stresses in a fiber strand dispensed from the reel. With the reel payout system of this invention a high speed linear payout system controls an air-to-air, ground-to-air, or air-to-ground weapons via the fiber optic data link dispensed perpendicular to a rotational axis of a rotatable reel on which the fiber strand is wound.

Another object of the present invention is to provide an improved reel payout system that is constructed to avoid high torsional or bending stresses within the fiber strand during payout.

A further object of the present invention is to provide a reel payout system that is adapted for dispensing the fiber strand through a relatively small exit or payout aperture.

Still another object of the present invention is to provide a reel payout system that is dispensed generally perpendicular to the axis of rotation of a reel upon which the fiber strand is wound thereby avoiding, or at least minimizing, a helical waveform that must be collapsed within a relatively short distance when the fiber strand is dispensed through a relatively small exit aperture.

Still a further object of the present invention is to provide a reel payout system that is adapted for creating reduced fiber strand mechanical stresses during fiber strand payout.

Another object of the present invention is to provide a reel payout system that is simple in design and wherein fiber strand peel point bending and torsional stresses are substantially non-existent.

A further object of the present invention is to provide a reel payout system that is adapted for payout of a fiber strand through the outer circumference of a missile, a launch platform (e.g., an airplane), or a vessel's structure.

Still another object of the present invention is to provide a reel payout system that includes a length of fiber strand easily wound onto a reel and stored prior to use.

To accomplish the foregoing and other objects of this invention there is provided a reel payout system for linearly dispensing a fiber strand data link through a relatively small aperture at relatively high velocities.

The reel payout system comprises a housing forming a chamber, an exit aperture formed by the housing and providing communication between the chamber and the outside of the housing. A reel of fiber strand is mounted or supported in the chamber and the fiber strand is wound on the reel such the fiber strand unwinds off of the reel substantially perpendicular to the axis of rotation of the reel. A means for guiding the fiber intermediate the reel and the aperture is provided.

The fiber strand is helically wound on the reel. In this way a compact package of wound fiber is provided.

The reel is preferably located along an imaginary line defined by a longitudinal axis of the housing and the reel is supported in the housing whereby the axis of rotation of the reel is generally perpendicular to the longitudinal axis of the housing.

There is additionally provided a variety of means for generating rotation of the reel and controlling the rotation of the reel and some instances the ballooning of the fiber strand as it peels off of the reel. In the preferred embodiments disclosed herein, there are provided a motorized embodiment of the reel and an air driven embodiment of the reel.

Also, in the preferred embodiment the fiber strand is an optical fiber and the reel payout system dispenses the optical fiber in order to control a weapon launched from the ground or the air from a platform that is stationary or moving.

DETAILED DESCRIPTION

Figure 1:
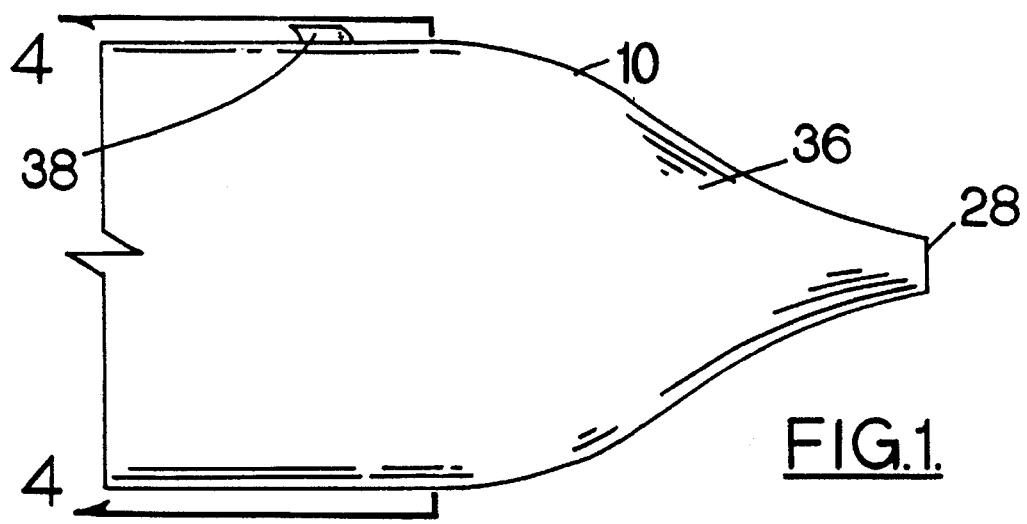
FIG. 1 is a side elevation view of a housing for a reel payout system of the present invention.
Figure 2:
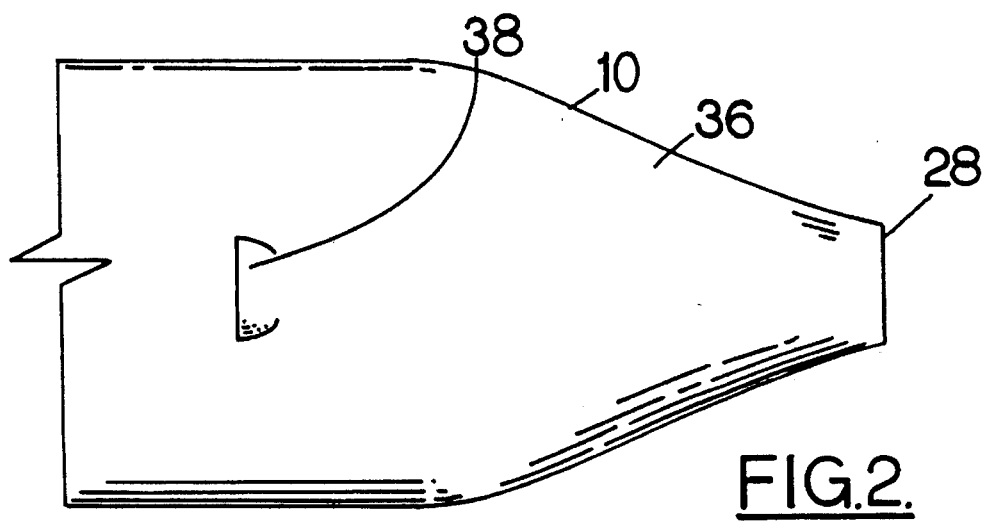
FIG. 2 is a top view of the housing depicted in FIG. 1.
Figure 3:
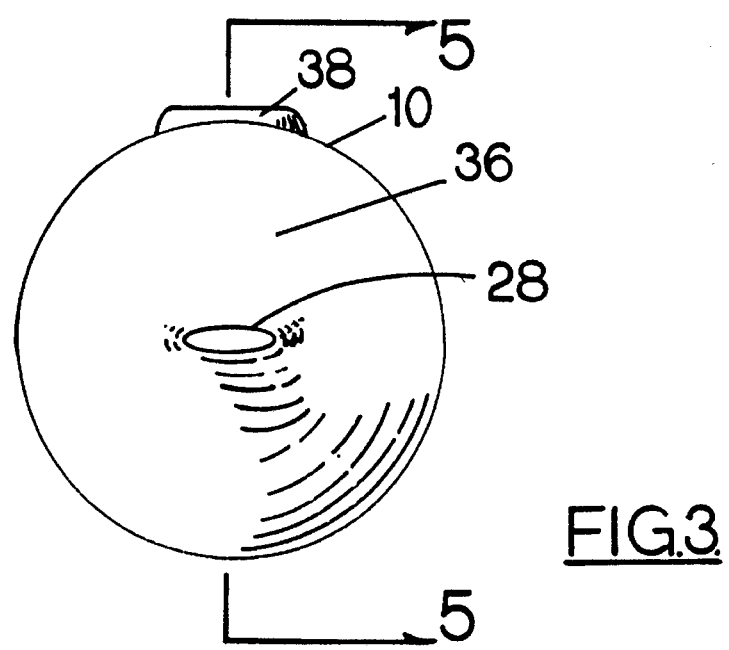
FIG. 3 is an end view of the housing depicted in FIG. 1.
Figure 4:
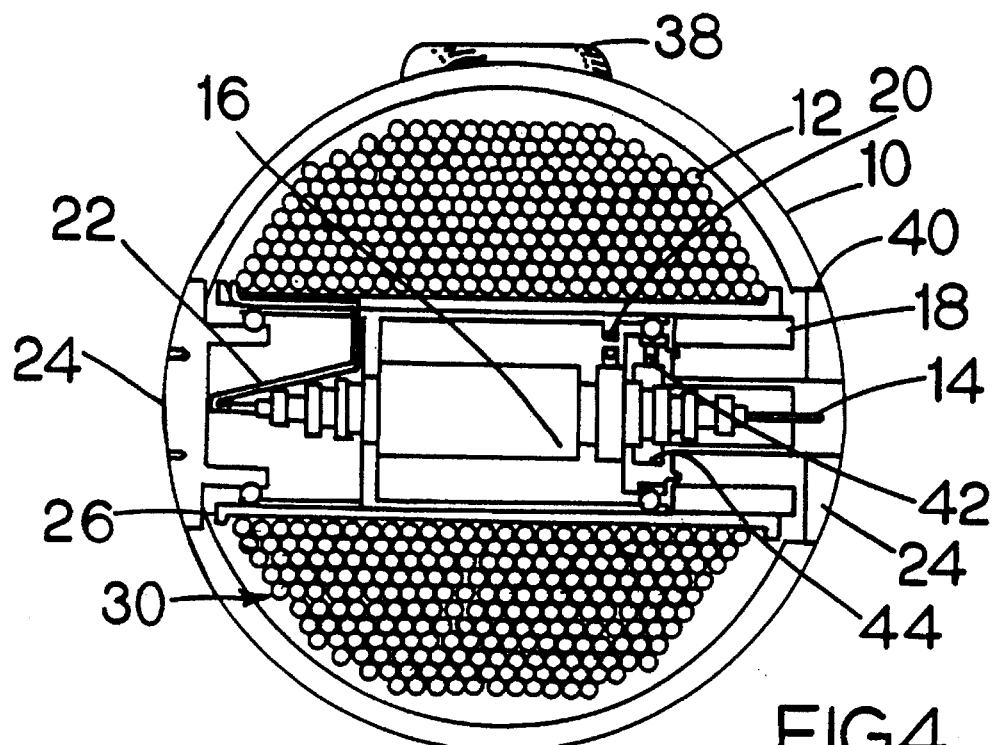
FIG. 4 is a cross sectional view taken along line 4—4 in FIG. 1.
Figure 5:
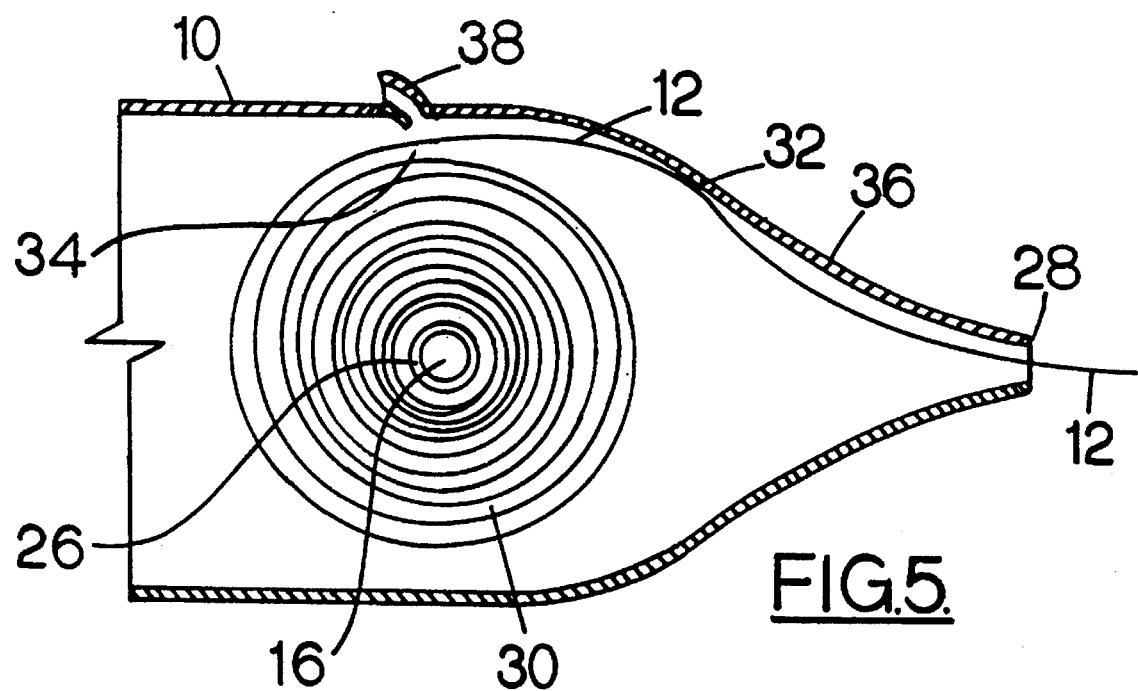
FIG. 5 is a cross sectional view taken along line 5—5 in FIG. 3.

Referring now to the drawings there are shown preferred embodiments for the reel payout system of this invention. The reel payout system is described in connection with a missile application to transmit data to and from the weapon. The reel payout system of the present invention is particularly adapted for providing high speed optical fiber payout and is characterized by unwinding an optical fiber strand from a rotating reel substantially perpendicular to the reel's axis of rotation.

The drawings show the payout canister 10 for the improved reel payout system of the present invention for providing for the unwinding and high-speed payout of the optical fiber 12. The invention comprises a rotating optical fiber payout reel 30 connected to a suitable control system through a portion of non-rotating optical fiber 14. The reel 30 includes the drum 26 and rotates without damaging the non-rotating fiber portion due to the use of a suitable slip-ring support assembly 16, including an optical slip ring to accommodate the optical fiber. Control of the payout system is accomplished by means of a suitable torque control assembly, the use of which is known in the art.

A conventional rotation sensor 20 provides the necessary feed back information for generating the desired amount of reel rotation, which is done by conventional means.

A rotating portion of the optical fiber 22 extends from the other end of the optical slip ring assembly. A canister access port 24 is provided on either side of the canister, preferably along the reel's axis of rotation. This provides access to the reel drum 26 and the wound fiber thereon. The fiber extends through an exit aperture 28 from an optical fiber reel 30.

A balloon or boattail 32 of optical fiber 12 typically exists between a peel point 34 established where the fiber 12 unwinds from the reel 30. A canister payout cone 36 guides the exiting fiber to reduce the boattail and therefore the mechanical forces in the fiber.

In one preferred embodiment optical fiber dispensing can be assisted by providing an air scoop 38 for capturing and channeling aerodynamic air into the canister to reduce fiber ballooning. In another preferred embodiment a compressed air supply 40 brings compressed air to a discharge 42. The compressed air also assists in the payout of fiber by establishing air flow within the canister to reduce fiber ballooning. Preferably a helical pattern of air flow is established within the canister for this purpose.

A torque motor assembly 44 can also be used to provide rotational energy for the reel assembly. Rotation is controllable by utilizing the torque motor components to provide the brake 18 in a conventional matter, for example, by reversing motor polarity and applying current.

It will be understood from the schematic depiction of the scoop 38 and the compressed air discharge 42 that scoop design and compressed air piping and discharge design will be accomplished or modified to suit the particular application. Enough air input should be provided to keep the unwound fiber between the peel point 34 and the aperture 28 from contacting the inside wall of the canister payout cone 36 and from contacting the aperture 28 as it passes therethrough.

Figure 6:
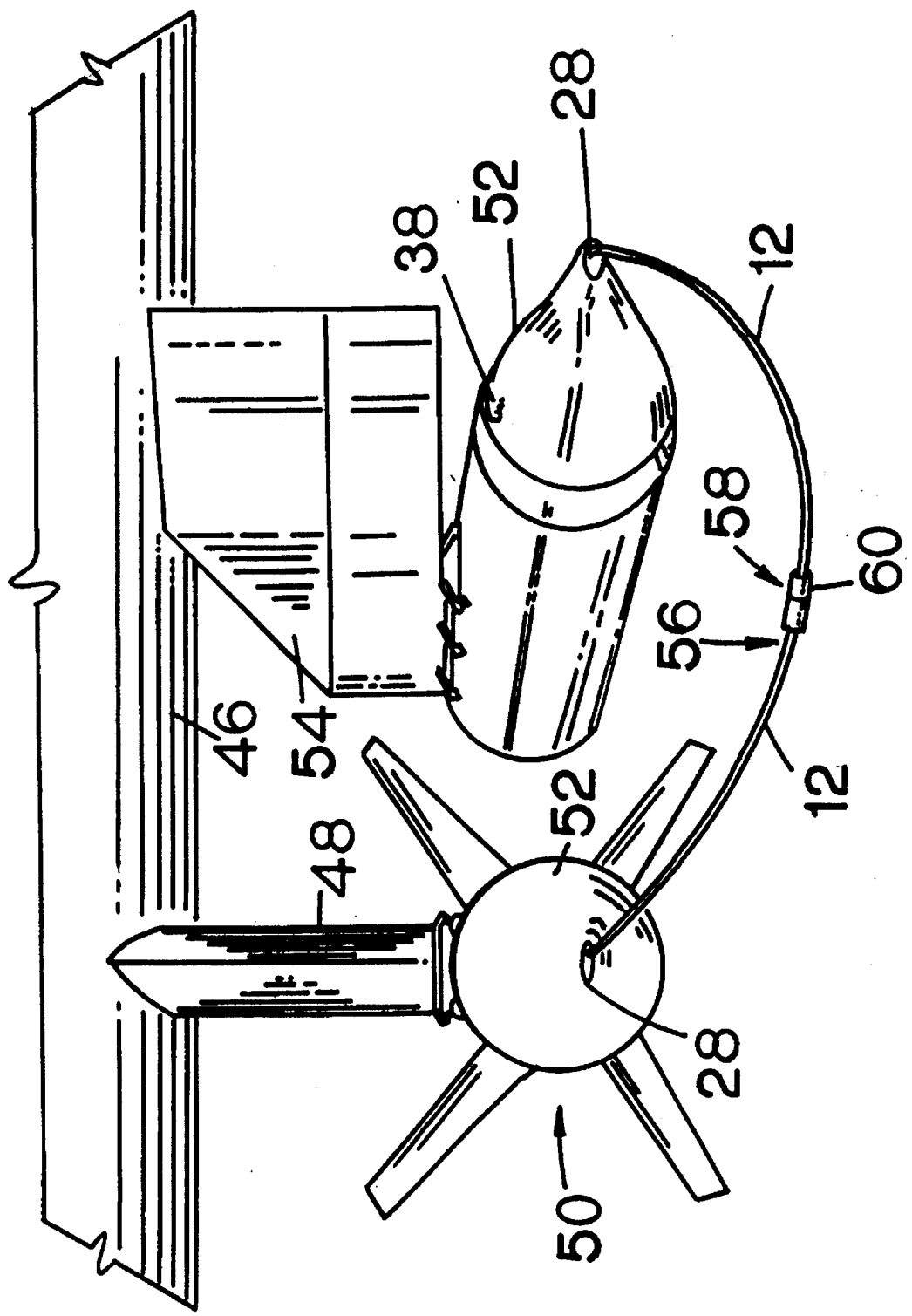
FIG. 6 is a proposed arrangement for adapting the reel payout system of the present invention to an airborne platform and associated weapon.

In operation, and as shown in FIG. 6, in connection with the airborne platform weapon system previously mentioned to transmit data between the weapon and the control system, an aircraft 46 provides a conventional weapon mounting rack 48 for an air-to-air or an air-to-ground weapon 50. In conventional guided weapon arrangements one optical fiber reel canister 52 is carried under the wing and another reel canister 52 is carried by the weapon. The under-wing canister 52 has a dedicated mounting rack 54.

External fiber strands 56 extend between the two canisters and are typically joined at a splice 58 with a suitable protective covering 60 of shrink tubing, for example.

In use, the fiber is dispensed through the payout aperture 28 from a rotating reel drum 26. The optical fiber is dispensed perpendicular to the axis of rotation of the reel drum 26.

Perpendicular payout from the peel point 34 occurs without creating a helical waveform in the optical fiber, such as occurs when dispensing optical fiber from a helically wound bobbin generally parallel to the longitudinal axis of the bobbin. Peeling the fiber perpendicularly from the spinning reel 30 results in substantially no bending or torsional fiber stress at the peel point 34.

The reel drum 26 is driven by either aerodynamic forces or by the motor assembly 44. The rotation sensors 20 provide data for determining the optical fiber payout rate. Conventional controllers provide the necessary commands for controlling the payout rate. The brake 18 can work with either the torque control of the motor, for example, or by redirecting the aerodynamic forces available to the system.

Data is transmitted over the optical fiber 12 and through the optical slip ring support assembly 16 to conventional weapon electronic transmitter and receiver modules (not shown). The reel control signals are monitored to prevent the fiber dispensing rate from exceeding the required linear payout rate.

The free stream air provided by the air scoop 38 or the pressurized air discharge 42 is directed to the interior of the canister proximate the peel point 34 on the reel 30 upstream of the exit aperture 28 in the payout cone 36. The forced air assists in driving the payout reel 30 and can be ducted into the cone so as to create a helical air flow to assist in optical fiber payout.

In a preferred embodiment the optical slip ring support assembly 16 provides a rotary joint capable of transmitting the optical information from the payout reel 12 to the conventional control modules for transmitting and receiving this information. It will be understood that the system of the present invention can be used with either single or multi-mode fibers.

The payout cone 36 guides the fiber through the exit aperture 28 and the geometry of the payout cone will not allow excessive fiber ballooning. The payout cone also assists in establishing the helical air flow through the canister which eliminates fiber contact with the inner wall of the cone and the aperture.

The reel drum 26 is supported on a precision duplex bearing system. The bearing system positions and supports the reel drum. A high frequency response bearing is preferred since the high frequency response tends to reduce fiber strand payout forces. In addition, a high frequency dither will assist in reducing the fiber strand payout forces.

From the foregoing description those skilled in the art will appreciate that all of the objects of the present invention are realized. An improved reel payout system has been shown and described for providing a desirable solution to the need for a linear fiber strand payout system that can dispense a fiber data link or other strand member through a relatively small diameter exit aperture at relatively high velocities e.g. those between a modern aircraft and weapon joined by such a link and moving apart.

The forces, e.g., torsional and bending, that the fiber is subjected to during payout are minimized by dispensing the fiber from a reel. The fiber is dispensed perpendicular to the rotational axis of the rotatable reel on which the fiber strand is wound.

The fiber stresses typically present when dispensing from a helically wound bobbin are not present and there is no helical waveform that must be collapsed within a relatively short distance when the fiber strand is dispensed through the relatively small exit aperture 28. The aperture 28 can be coated with TEFLON, a trademark of E.I. Du Pont Company or another friction reducing material to minimize or eliminate friction between the fiber and the aperture.

The reel payout system of the present invention has a simpler winding process than conventional helically wound bobbins. Peel point stresses are substantially non-existent. Therefore, a higher density more tightly wound fiber winding is possible on the reel.

Figure 7:
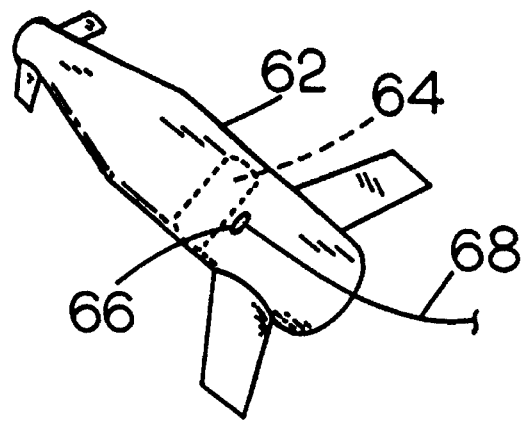
FIG. 7 is a proposed arrangement for adapting the reel payout system of the present invention to a missile structure.

While specific embodiments have been shown and described, many variations are possible. The particular shape of the payout canister 10 and the shape of the payout cone 36 may be changed as desired to suit the particular equipment with which it is used. In another version of the present invention a modified weapon 62, FIG. 7 includes an internal reel payout system 64 constructed in accordance with the foregoing description, except that the payout exit aperture 66 for the optical fiber strand or other strand 68 is built into the circumference of the weapon.

Figure 8:
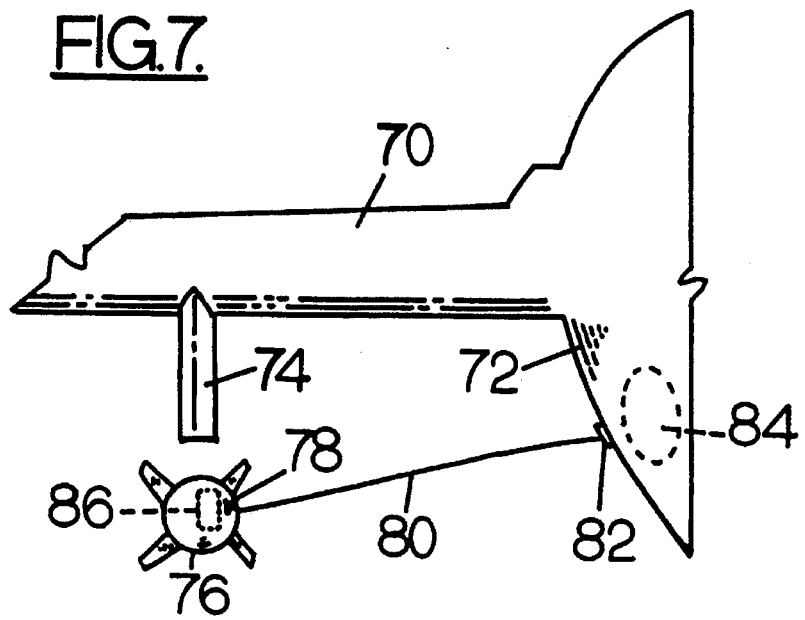
FIG. 8 is a proposed arrangement for adapting the reel payout system of the present invention to an aircraft structure.

With the compactness allowed by the present invention, the slip ring assembly can have a diameter as small as one (1) inches. An aircraft wing 70 in FIG. 8 extending from an aircraft structure 72 could use a conventional weapon mounting rack 74 to launch a weapon 76. The present invention would allow transfer of data by dispensing glass fiber from a weapon exit aperture 78 an optical data transmission fiber 80 while also dispensing the fiber through an aircraft exit aperture 82. The aircraft carries a payout reel 84 and the weapon also carries a payout reel 86.

Figure 9:
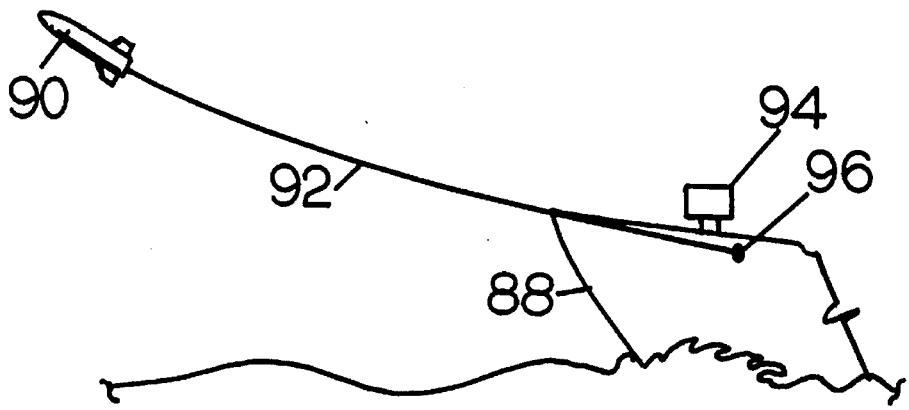
FIG. 9 is a proposed arrangement for adapting the reel payout system of the present invention to a seaborne platform or structure.

The present invention could be adapted for use with a seaborne platform providing a ship 88 in which a reel payout system of the present invention is carried, as in FIG. 9. A weapon 90 containing a reel payout system with its trailing optical data transmission fiber 92 is launched from launcher 94 and data fiber is dispensed through an exit aperture 96 from a reel payout system of the present invention.

In other embodiments of this invention, any fiber strand could be wound on a reel and dispensed as described. Two areas in which this may be found desirable is in the telecommunications industry for dispensing optical communications cable or in dispensing fiber material when manufacturing a item produced by a fiber winding process.

Having described the invention in detail, those skilled in the art will appreciate that modifications may be made of the invention without departing from its spirit. Therefore, it is intended that the scope of this invention be determined by the appended claims and their equivalents.

What is claimed is:

1. A reel payout system for a fiber strand, comprising:

a housing having a chamber, said chamber and said housing having a common longitudinal axis extending centrally therethrough, and having a centrally disposed aperture coaxial with said longitudinal axis at one end of said housing;

a reel of fiber strand, said reel having a longitudinal axis of rotation extending therethrough, the fiber strand wound on the reel such that the fiber strand unwinds off the reel substantially perpendicular to the longitudinal axis of rotation of the reel, said reel disposed in said chamber at the end opposite said aperature and such that the longitudinal axis of rotation of said reel is perpendicular to the longitudinal axis of said chamber;

means for supporting the reel of fiber strand for rotation within the chamber about said longitudinal axis of rotation of said reel; and means for unwinding fiber strand from said reel of fiber strand, and guiding said unwound fiber strand through said aperature; and means intermediate said reel and aperature, for reducing ballooning of said unwound fiber strand and eliminating contact with said housing as said unwound fiber strand exits said aperature.

2. The system of claim 1 wherein said means for unwinding and guiding, and said means for reducing ballooning, and eliminating contact comprises:

the chamber having a conical-shaped portion intermediate the aperature and a peel point of the fiber strand on said reel; and a means for providing a predetermined air flow adjacent the conical-shaped portion of said chamber from said peel point to and through said aperature to keep unwound fiber strand from contacting the conical-shaped portion of the chamber in said housing.

3. The system of claim 2 wherein said means for providing said predetermined air flow comprises:

a compressed air supply disposed in said chamber to provide the predetermined air flow for supportably moving said fiber strand from said peel point through said housing and out said aperature.

4. The system of claim 2 wherein said means for providing said predetermined air flow is an air scoop extending from said chamber through said housing to capture and channel external aerodynamic air into said chamber from a point adjacent said peel point through said housing to said aperature.

5. The system of claim 2 further comprising a means for rotating said reel about the longitudinal axis of rotation of said reel.

6. The system of claim 5 further comprising a means for controlling the reel linear payout rate to prevent fiber strand dispensing rate from exceeding the required linear payout rate.

7. The system of claim 6 wherein said means for controlling said reel linear payout rate comprises:

sensing means mounted in said housing in juxtaposition with said reel for detecting rate of rotation of said reel; and a feedback means connected between said sensing means and said means for rotating said reel for controlling said reel linear payout rate.

8. The system of claim 5 wherein said means for rotating said reel is a motor mounted to said housing and coupled to said reel.

9. The system of claim 8 wherein said motor is electrically powered by a battery mounted to said housing and connected to said motor.

10. The system of claim 5 wherein said means for rotating said reel is by aerodynamic force.

11. A reel payout system for a fiber strand comprising:

a housing having a chamber, said chamber and said housing having a common longitudinal axis extending centrally therethrough and said chamber also having a conically-shaped portion at one end, said portion having an aperature centered about said longitudinal axis at the vertex end of said conically-shaped portion;

a reel of fiber strand, said reel having a longitudinal axis of rotation extending therethrough, the fiber strand wound on said reel such that fiber strand unwinds off the reel substantially perpendicular to the longitudinal axis of rotation of said reel, said reel disposed in said chamber at the end opposite said aperature such that the longitudinal axis of rotation of said reel is perpendicular to the longitudinal axis of said chamber;

means for supporting said reel of fiber strand for rotation within said chamber about said longitudinal axis of rotation of said reel; and means for transporting said fiber strand from a peel point on said reel, through said chamber and to said aperature without contacting any interior surface of said housing.

12. The system of claim 11 wherein said means for transporting said fiber strand is an air flow directed from the vicinity of said reel about the interior surface of said chamber toward said aperature.

13. The system of claim 12 wherein said air flow is supplied by an air scoop means extending into the aerodynamic flow external to said housing, and directing said aerodynamic flow through said housing and into said chamber near said reel.

14. The system of claim 12 wherein said air flow is provided by a source of compressed air affixed to the interior of said housing and providing airflow from a point near said reel.

15. The system of claim 11 further comprising a means for controlling the reel linear payout rate to prevent fiber strand dispensing rate from exceeding the required linear payout rate.

16. The system of claim 11 further comprises a means for rotating said reel about the longitudinal axis of rotation of said reel.

17. The system of claim 16 wherein said means for rotating said reel is a motor mounted to said housing and coupled to said reel.

* * * * *